(12) United States Patent
Rao et al.

(10) Patent No.: US 10,453,014 B2
(45) Date of Patent: Oct. 22, 2019

(54) SYSTEMS AND METHODS FOR UTILIZING COMPLIANCE DRIVERS TO CONSERVE SYSTEM RESOURCES AND REDUCE COMPLIANCE VIOLATIONS

(71) Applicant: Bank of America Corporation, Charlotte, NC (US)

(72) Inventors: Ashok Rao, Charlotte, NC (US); Rachel Nemecek, Charlotte, NC (US); Matthew Prue, Tewksbury, MA (US); Kate Cibotti, Boston, MA (US); Cynthia A. Nutini, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 779 days.

(21) Appl. No.: 14/798,530

(22) Filed: Jul. 14, 2015

(65) Prior Publication Data

US 2017/0017706 A1   Jan. 19, 2017

(51) Int. Cl.
*G06F 7/00* (2006.01)
*G06Q 10/06* (2012.01)
*G06F 17/22* (2006.01)
*G06F 16/25* (2019.01)

(52) U.S. Cl.
CPC ....... *G06Q 10/0635* (2013.01); *G06F 16/254* (2019.01); *G06F 17/2264* (2013.01)

(58) Field of Classification Search
CPC .......................... G06F 16/254; G06F 17/2264
USPC ....................................................... 707/687
See application file for complete search history.

(56) References Cited

U.S. PATENT DOCUMENTS

| | | | |
|---|---|---|---|
| 6,651,060 B1 * | 11/2003 | Harper | G06F 21/6245 |
| 7,593,859 B1 | 9/2009 | Owens et al. | |
| 7,945,541 B1 * | 5/2011 | Schendel | G06F 16/93 707/695 |
| 8,260,654 B2 | 9/2012 | Owens et al. | |
| 8,359,284 B2 | 1/2013 | Nemecek et al. | |
| 8,756,152 B2 * | 6/2014 | Anne | G06Q 10/0635 705/38 |
| 8,832,657 B1 | 9/2014 | Cowan et al. | |
| 8,892,409 B2 | 11/2014 | Mun | |
| 9,020,857 B2 | 4/2015 | Mun | |
| 2002/0198878 A1 * | 12/2002 | Baxter | G06F 17/2229 |

(Continued)

*Primary Examiner* — Eliyah S. Harper
(74) *Attorney, Agent, or Firm* — Weiss & Arons LLP; Michael A. Springs, Esq.

(57) ABSTRACT

Systems and methods for utilizing compliance drivers to conserve system resources are provided. Data that corresponds to a pre-determined historical period may be used. A method may extract issue information, regulations data, operations loss data, drivers data, pending activities data and/or pending examinations data. The method may perform a plurality of transformations on the issue information, the drivers data, the regulations data, and the operations loss. The transformations may apply enterprise compliance hierarchy information and transform the data associated with the issue information, the drivers data, the regulations data, and the operations loss data into quarterly information. The method may include performing transformations on issue information, regulations data, operations loss data and drivers data. The method may perform final transformations in order to either allocate resources to remediate a compliance trend, remediate a compliance projection, or correct a current compliance issue.

17 Claims, 8 Drawing Sheets

(56) References Cited

U.S. PATENT DOCUMENTS

| | | | |
|---|---|---|---|
| 2007/0208669 A1* | 9/2007 | Rivette | G06Q 10/10 705/59 |
| 2008/0162558 A1* | 7/2008 | Rao | G06F 8/61 |
| 2008/0163197 A1* | 7/2008 | Rao | G06F 8/61 717/177 |
| 2008/0163199 A1* | 7/2008 | Rao | G06F 8/61 717/177 |
| 2014/0075273 A1* | 3/2014 | Fisher | G06F 17/2264 715/201 |
| 2014/0297687 A1* | 10/2014 | Lin | G06F 16/24524 707/779 |
| 2015/0058260 A1 | 2/2015 | Mun | |
| 2015/0073823 A1* | 3/2015 | Ladd | G06F 16/9535 705/2 |
| 2015/0088783 A1 | 3/2015 | Mun | |
| 2017/0168854 A1* | 6/2017 | Rao | G06F 8/315 |
| 2018/0348717 A1* | 12/2018 | Zhao | G05B 17/02 |

* cited by examiner

| 1002 | DIRECTION OF COMPLIANCE -SUMMARY |
|---|---|
| | NAME OR LINE OF BUSINESS |

1008 → COMPLIANCE MEASURES ← 1010  1012

| 1004 | COMPLIANCE MEASURES | | |
|---|---|---|---|
| | ELEMENT | CURRENT LEVEL ① of RISK | TREND/FORECAST ② | STRENGTH OF ③ RELATIONSHIP |
| 1014 | Regulatory Changes | Low | Decreasing | Strong |
| 1016 | Complaints | Medium | Increasing | Moderate |
| 1018 | Exams | Low | Stable | N/A |
| 1020 | Enforcement Actions | Low | N/A | N/A |

| 1022 | CONTROL EFFECTIVENESS MEASURES | | 1038 | 1040 |
|---|---|---|---|---|
| 1024 | ELEMENT | CURRENT LEVEL of RISK | TREND/FORECAST | STRENGTH OF RELATIONSHIP |
| 1026 | Issues | Medium | Stable | N/A |
| 1028 | Metrics | Low | Stable | Moderate |
| 1030 | Operational Loss | High | Stable | Weak |
| 1032 | M&T Results | Low | Increasing | Strong |
| 1034 | M&T Activities | Medium | Decreasing | Moderate |

FIG. 10A

- Data pulls are for 15 months, stored in 3 different SQL servers and IBM COGNOS

Open Issues Data Pull
- Issue Type
- Issue ID    1132
- Date created
- Issue reporting group

Metrics Data Pull
- Metric Type    1134
- Metric Instance
- Metric Rating
- Date Created

REGS Data Pull
- Rating Name    1136
- Category Name
- Compliance date
- REG Change status

OPS Loss Data Pull
- Date of Loss
- Loss Amount    1138
- Type of loss
- Total Loss Amount

Activities (Monitoring & testing) data pull
- Total Activities    1140
- Executed Activities
- Past Due Activities
- Vendor vs. Internal Activities
- Manual vs. Automated Activities

Regulatory Exams    1141
- Number of exams completed
- Number of issues arising from exams
- Number of clean exams

Manual data pull & Transformations
- Complaints Data    1148
- M&T results Data

SAS Transfomations

Standard Data Transformations
- Apply Enterprise Compliance
- Hierarchies (ERH)
- Transform dates into Quarters    1142

Additional Data Transformations
- *Issues:*    1144
- Calculate Current issue, New issue, past due.
- Group issues by type (Regulator, Audit, compliance and control enhancements
- *Regs:*
- Calculate Current due, past due and completed
- *Ops Loss:*
- Apply Base Levels
- Calculate loss by category
- *Metrics*
- Calculate Red, Green, Yellow ratings
- Calculate total rating
- *Activities*
- Calculate ratio of past due to executed
- Calculate ratio of manual vs. automated vendor vs. internal activities
- *Exams*
- Calculate ratio of issues per exam
- Calculate percentage of clean exams

Final Calculations:
- Calculate Standard Deviations for last 4 quarters
- Apply Threshold values based on previous quarters standard deviations to current quarter
- Calculate trends based on 3 month rolling average    1146

Output    1150
- Data is loaded into templates and reported in IBM COGNOS, MS Excel & MS PowerPoint

FIG. 11

SYSTEMS AND METHODS FOR UTILIZING COMPLIANCE DRIVERS TO CONSERVE SYSTEM RESOURCES AND REDUCE COMPLIANCE VIOLATIONS

FIELD OF TECHNOLOGY

This invention relates to computer-implemented compliance drivers. For the purposes of this application compliance drivers may be understood to be durable drivers for assessing current and projected compliance.

BACKGROUND OF THE DISCLOSURE

A quantitative foundation for the assessment of a direction of compliance is needed. Such a foundation may include a determination of a current direction of compliance with respect to a historical record of past compliance.

It would be desirable to form a determination with respect to a current compliance condition and/or compliance trend.

SUMMARY OF THE DISCLOSURE

An apparatus for utilizing compliance drivers to conserve system resources is provided. Data that corresponds to a pre-determined historical period may be used. The apparatus may extract, from one or more databases, issue information, regulations data, operations loss data, drivers data, pending activities data and/or pending examinations data. The apparatus, using a processor, may perform a plurality of transformations on the issue information, the drivers data, the regulations data, and the operations loss. The transformations may apply enterprise compliance hierarchy information and transform the data associated with the issue information, the drivers data, the regulations data, and the operations loss data into quarterly information. The apparatus may further use the processor to perform transformations on issue information, regulations data, operations loss data and drivers data. The apparatus, using a processor, may perform final transformations in order to either allocate resources to remediate a compliance trend, remediate a compliance projection, or correct a current compliance issue. One way that system resources are conserved using the apparatus is that the apparatus preferably enables reduction of allocation of resources to entity components that are over-resourced. Another way that system resources may be conserved is that the system may reduce complaints by remediating a compliance trend, thereby saving system resources that are currently devoted to responding to the complaints.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 10A shows a first portion of a graphical user interface ("GUI") in accordance with certain embodiments;

FIG. 11 shows yet another illustrative flow diagram in accordance with certain embodiments.

DETAILED DESCRIPTION OF THE DISCLOSURE

Figure 1:
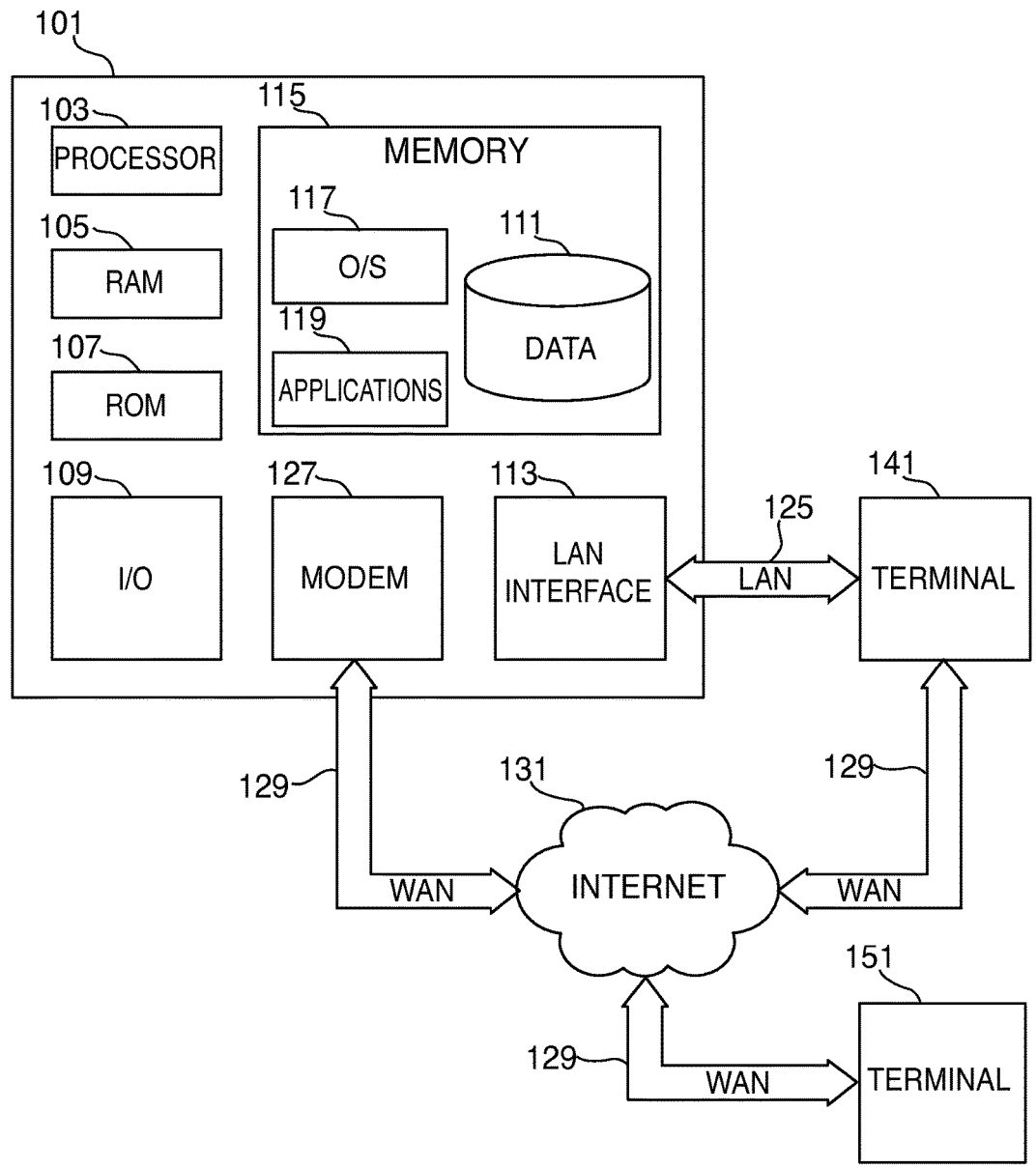
FIG. 1 shows an illustrative apparatus in accordance with principles of the invention.

The embodiments described herein provide a quantitative foundation for the assessment of the direction of compliance and/or the direction of risk of non-compliance. Such assessment may be continuous or occur at annual or periodic assessments. Such assessments may preferably supplement subject matter experts' knowledge with quantitative analytics. Such assessments may also provide consistent drivers for evaluating historical, current and projected compliance risk. In addition, such assessment may create a defensible, repeatable process for assessment.

Drivers considered in such assessments may include several preferably vectorized directions of compliance drivers. These compliance drivers may include degree and complexity of business change and regulatory change, number of regulatory environment changes, peer institution regulatory actions, monitoring and testing result trends, customer complaint trends and thematic issue analysis trends.

In certain embodiments, a data-based foundation may be provided for the above drivers. Other drivers may also be analyzed for inclusion in a more detailed analyses. Such drivers may include monitoring and testing in an operations control environment as well as any trends that may be derived therefrom; inquiries and enforcement actions related to regulations and/or regulatory changes; vendor-related processes; compliance-related operational losses; training effectiveness ratings which may or may not be survey based; and process/complexity measures.

In certain embodiments, the assessments may preferably be implemented to output a direction of compliance and/or direction of risk of non-compliance rating or for a particular driver. Such an output may then dictate a response based on the compliance and/or risk of non-compliance assessment.

Such a response, may, in certain circumstances, cause a change in configuration of an entity's compliance activities. For example, such a response may dictate termination of one or more activities that are in the direction of high risk of non-compliance.

Methodology for implementing systems and methods according to the invention may include obtaining an output that includes several components. Each of the components may preferably build on another and/or be used in combination with one another.

A first step of a method according to certain embodiments may include extracting foundational data that provides details regarding the current state of compliance and/or risk of non-compliance.

A second step may include ranking a current level on each compliance driver related to historical compliance and/or risk of non-compliance over time. An additional step may include assessing the strength of a relationship between each driver and compliance and/or risk of non-compliance as calculated using statistical correlation methods.

In addition, methodology may include quantification of the trend or forecast for that driver.

Representative values that correspond to each of a list of relevant drivers may be created for each entity, each line of business ("LOB") within an entity, or other suitable sub-entity that exists preferably independently, or substantially independently, within an entity. Representative values that correspond to each of a list of relevant drivers may be created for each enterprise area of coverage ("EAC"). An EAC refers to a group that has oversight over a Law/Rule/ and/or Regulation that has cross-LOB significance. Selection of relevant drivers may be based, at least in part, on the enterprise areas of coverage.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 shows an illustrative block diagram of system 100 based on computer 101. The computer 101 may have a processor 103 for controlling the operation of the device and its associated components, and may include RAM 105, ROM 107, input/output module 109, and a memory 115. The processor 103 will also execute all software running on the computer—e.g. the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, mouse, and/or stylus through which a user of computer 101 may provide input. The input/output module may also include one or more speakers for providing audio output and a video display device for providing textual, audio, audiovisual, and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve compliance information from a web-based server.

Additionally, application program(s) 119, which may be used by computer 101, may include computer executable instructions for invoking user functionality related to communication, such as e-mail, Short Message Service (SMS), and voice input and speech recognition applications.

Computer 101 and/or terminals 141 and 151 may also be devices including various other components, such as a battery, speaker, antennas (not shown).

Terminal 151 and/or terminal 141 may be portable devices such as a laptop, cell phone, Blackberry™, smartphone, or any other suitable device for storing, transmitting and/or transporting relevant information. Terminals 151 and/or terminal 141 may be other devices. These devices may be identical to system 100 or different. The differences may be related to hardware components and/or software components.

Figure 2:
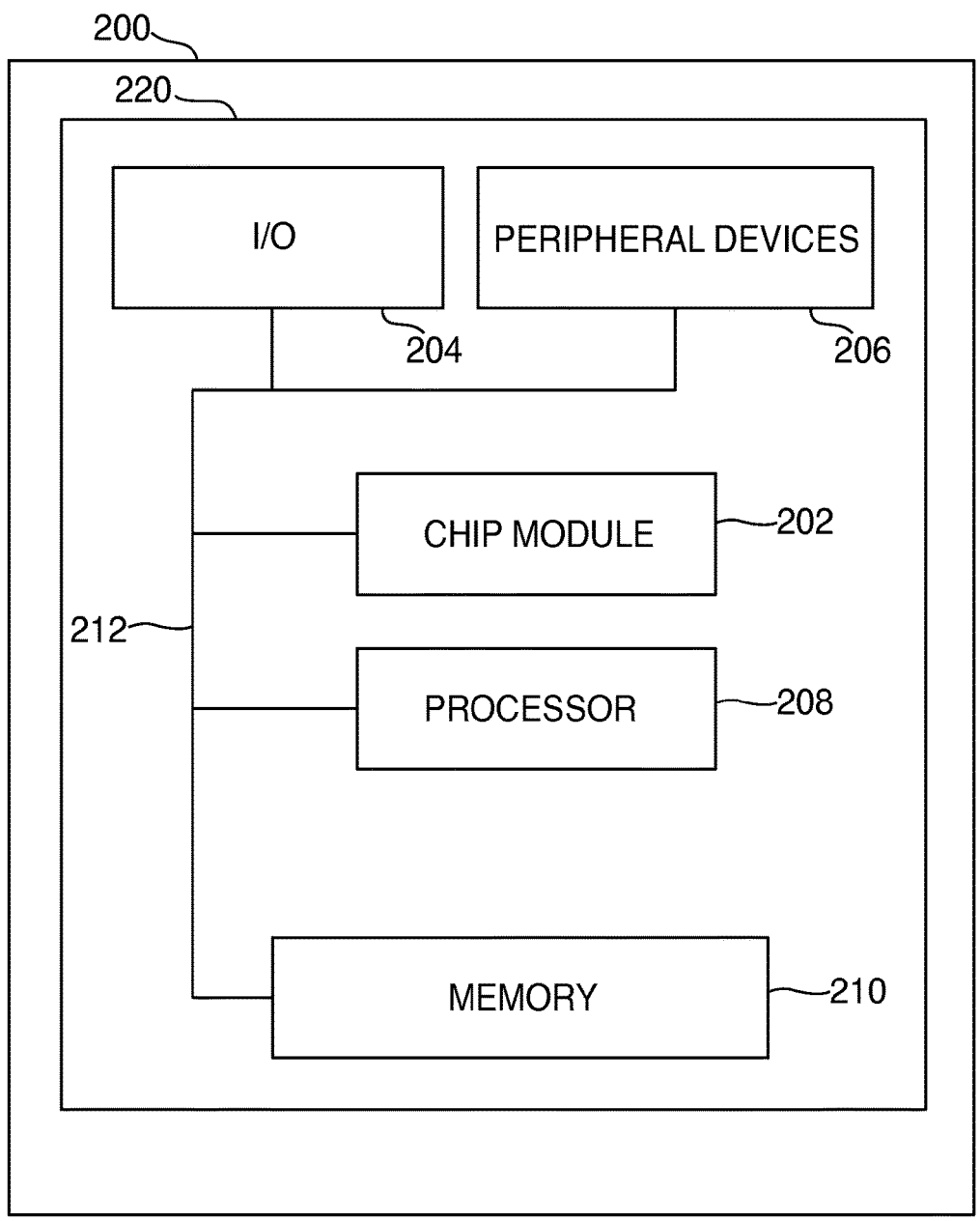
FIG. 2 shows another illustrative apparatus in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver cable and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information, structural parameters of the data, predict possible compliance trends and machine-readable memory 210.

Machine-readable memory 210 may be configured to store in machine-readable data structures: information pertaining to issues, regulations data, operations loss data, drivers data, pending activities data and/or pending examinations data.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
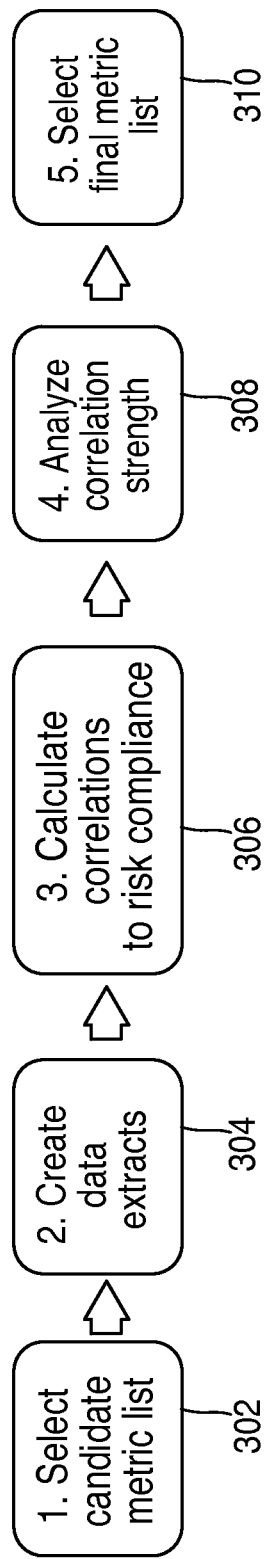
FIG. 3 shows a schematic diagram in accordance with certain embodiments.

FIG. 3 shows an illustrative flow diagram in accordance with certain embodiments. The strength of a relationship may define the strength of a statistical correlation between a particular data element and a measure of compliance. In this portion of the analysis, compliance or risk of non-compliance may be defined through various issues with some use of monitoring and testing results data, where possible.

Step 302 shows that a preferably inclusive set of potential drivers of compliance and/or risk of non-compliance may be initially considered for inclusion into a final driver list. Such a list may include, for example, complaints, monitoring and testing results, key risk indicators, regulatory changes, regulatory inquiries, enforcement actions, vendor-related processes, compliance-related operational losses, training survey ratings and process/complexity measures.

Step 304 shows that extracts of historical data for each driver may be created and combined with the compliance risk data. Step 306 shows that a statistical correlation may be calculated between each data element and the selected risk data. For example, the Spearman method may be used to obtain such a correlation.

Step 308 shows that correlation coefficients may be based on strength—e.g., greater than 0.60 may be determined to be a strong correlation, 0.30-0.60 may be determined to be a moderate correlation and less than 0.30 may be determined to be a weak correlation that is statistically insignificant.

It should be noted that certain of the drivers may be weighted. It should be noted that the stronger the relationship between the driver and the compliance and/or risk of non-compliance, the more the driver should be weighted. Therefore, a more heavily-weighted risk driver should have a greater effect on the evaluation of the direction of the compliance assessment generally.

Step 310 shows selecting the final driver list.

Figure 4:
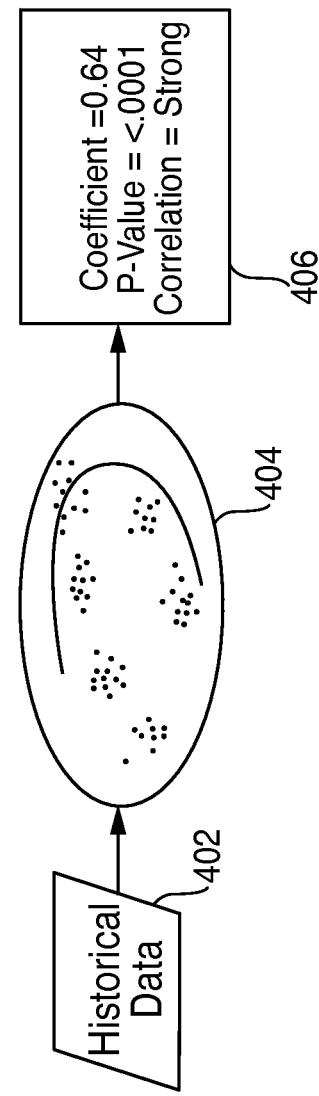
FIG. 4 shows an illustrative flow diagram in accordance with certain embodiments.

FIG. 4 shows another illustrative hybrid diagram in accordance with certain embodiments. Step 402 shows extracting historical data for one or more drivers. Step 404 shows that a correlation is performed on each of the drivers. Step 406 shows that a coefficient, a p-value and a correlation are determined based on the data. In this exemplary illustration, the coefficient obtained is 0.64, the P-Value obtained is less than 0.0001 and the correlation may be considered a relatively strong correlation.

Figure 5:
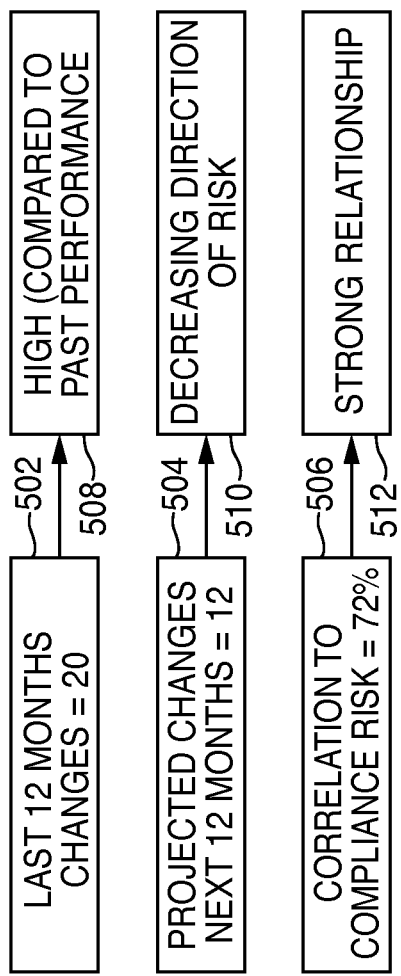
FIG. 5 shows an illustrative flow diagram in accordance with certain embodiments.

FIG. 5 shows an illustrative flow diagram in accordance with certain embodiments. The current level of compliance, and/or risk of non-compliance, drivers preferably provide summary information covering the assessment reporting period. Such information may be organized according to each LOB and/or control function ("CF") of an LOB. A CF may be understood to be one or more non-revenue-generating departments or other sub-division of an LOB.

Such information may be supplemented with a comparison of the driver values between a current quarter and historical quarters. While assessments may be performed at a more granular organization level, nevertheless the illustrations described herein focus on the LOB level of an entity.

As background, FIG. 5 shows, at 502, that for each driver or driver in a pre-determined list, data may be pulled at the reporting levels defined by the risk assessment process. Specifically, step 502 shows that the system has recorded 20 regulatory environment changes in the last twelve months. Step 508 shows that the 20 changes is relatively higher as compared to past performance. It should be noted that a relatively higher level of changes over past performance may indicate a trend of relatively increasing compliance issues.

Step 504 shows projected regulatory changes. The projected regulatory changes may be determined with respect to a future period of time. Such a future period of time may be 12 months into the future or some other future period of time. Step 504 shows that the projected regulatory changes may be 12. Step 510 shows, because the projected changes are less than the past changes, the trend indicates a decreasing direction of risk.

Step 506 shows an exemplary level of correlation, 72%, of the exemplary driver—i.e., regulatory environment changes—to compliance risk generally. Step 512 shows that a correlation of 72% indicates a relatively strong relationship between the exemplary driver—i.e., regulatory environment changes—to compliance risk generally. In preferred embodiments, preferably all three drivers (502, 504 and 506) may be considered to evaluate an overall state of compliance and/or risk of non-compliance for both the current and subsequent review periods.

Figure 6:
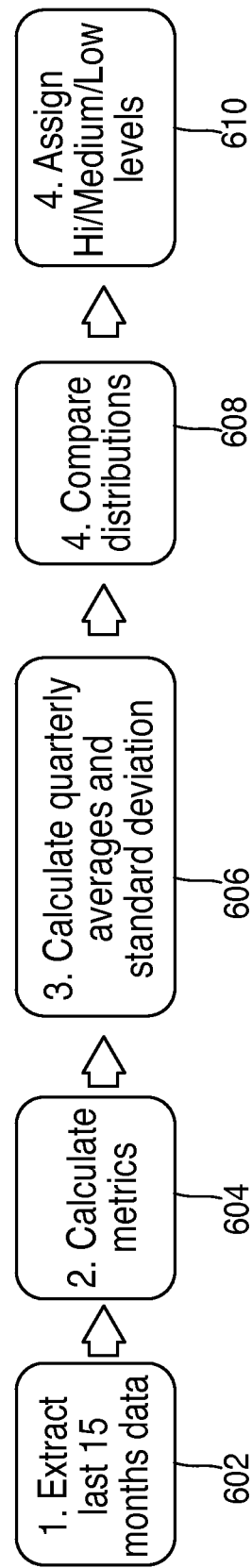
FIG. 6 shows another illustrative flow diagram in accordance with certain embodiments.

FIG. 6 shows an illustrative flow diagram in accordance with certain embodiments. Step 602 shows a step of extracting data for a pre-determined period—e.g., 15 months. Such data may correspond to one or more exemplary drivers. Each of the exemplary drivers may have similar or dissimilar correlations to determinations of compliance or risk of non-compliance. Such data may correspond to one or more pre-determined time periods.

Step 604 shows calculating compliance directions for the exemplary drivers. Such directions may be calculated for the past. Such directions may be calculated for the future. Step 604 may also include calculating correlation of one or more exemplary drivers to compliance or risk of non-compliance.

Step 606 shows calculating quarterly averages, either in the past or in the future, for the exemplary drivers. Step 606 also shows calculating a standard deviation.

Step 608 shows comparing distributions of data. Step 610 preferably assigns low/medium/high compliance thresholds using the comparisons set forth in step 608. In certain embodiments, a low compliance threshold may correspond to a driver that is at or close to the mean. A medium compliance threshold may correspond to a driver that is between the mean and one standard deviation and a high compliance threshold may correspond to a driver that is greater than the mean plus one standard deviation. A high rating for a driver may indicate elevated risk in the current quarter. A low rating may indicate decreased risk in the current quarter.

The values assigned in step 610 preferably correspond to the current quarter's value based on the relationship of the current quarter's value to the historical averages and variability.

Figure 7:
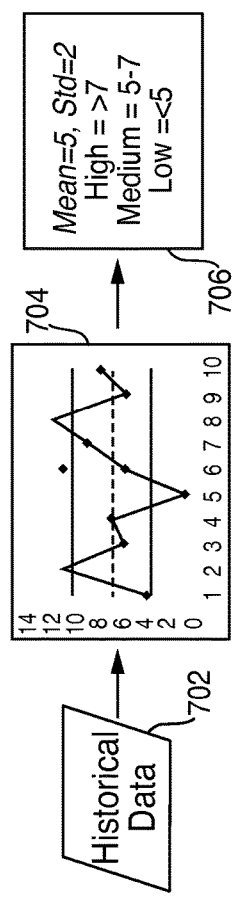
FIG. 7 shows another illustrative hybrid diagram in accordance with certain embodiments.

FIG. 7 shows an illustrative hybrid diagram in accordance with certain embodiments. FIG. 7 further develops the concepts set forth in FIG. 6. Step 702 shows using historical data relating to one compliance driver and/or risk of compliance driver. Preferably the data may be derived as shown in step 602 of FIG. 6.

Step 704 shows, schematically deriving a mean for the driver, a standard deviation for the driver, a high threshold for the driver, a medium threshold for the driver and a low threshold for the driver. It should be noted that a high rating for a driver may indicate an elevated risk in the current quarter. A low rating may indicate a decreased risk in the current quarter.

Step 706 shows that, in this exemplary illustration, the mean threshold for the driver was 5, the standard deviation was 2, the high threshold was greater than 7, the medium threshold was between 5 and 7 and the low threshold was less than 5.

Figure 8:
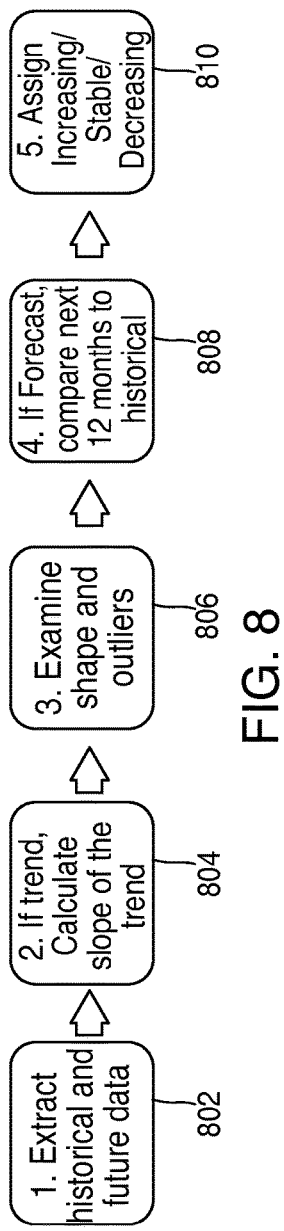
FIG. 8 shows yet another illustrative flow diagram in accordance with certain embodiments.

FIG. 8 shows another illustrative flow diagram in accordance with certain embodiments. Step 802 shows extracting historical and future data for a driver.

Step 804 shows querying whether a trend can be derived from the extracted data. If a trend can be derived from the extracted data, step 804 shows further calculating the slope of the trend.

If the trend is identified and can be calculated then step 806 may include examining the shape and outliers regarding the trend of data. When a trend cannot be identified and/or calculated then the flow diagram may preferably periodically return to extracting historical and future data for this driver or for other drivers, as shown at step 802.

If a forecast can be determined, then, at step 808, the flow diagram may compare the forecasted next 12 months to the previous 12 months. Based upon the comparison, step 610 may assign an increasing/stable/ or decreasing characterization to the compliance value associated with the driver.

Figure 9:
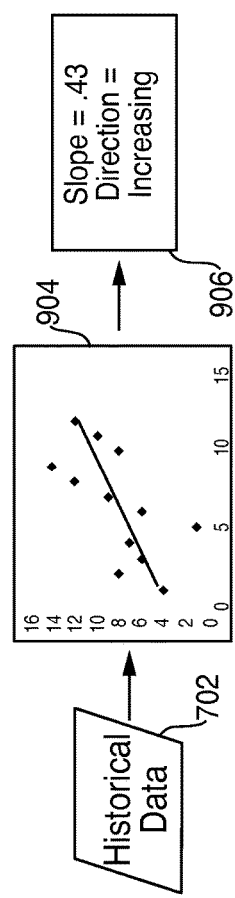
FIG. 9 shows another illustrative hybrid diagram in accordance with certain embodiments.

FIG. 9 shows another illustrative hybrid diagram in accordance with certain embodiments. FIG. 9 relates to the trend or forecast derived from the activity set forth in the available data described above. The trend or forecast may define the direction of the values of the driver and/or provide a forecast based on available data for the driver in the future.

In one example, future regulatory changes may be known ahead of time. Therefore, values can be provided in the form of a forecast. The forecast may reflect the known future regulatory changes. On the other hand, other drivers, such as future complaints, may only be informed by the historical trend and are typically unknown.

Step 902 shows that, for each driver in the drivers list, data may be pulled at the reporting levels defined by the assessment process.

In some embodiments, such data may correspond to the last 15 calendar months of all drivers, and the subsequent 12 months for forecast drivers. Data points may be calculated, for example, on a three-month, or some other suitable time window, rolling average basis in order to minimize month-over-month variability that could mask a relevant trend.

Step 904 shows that, for drivers that may exhibit trending, a trend line can be fit into the historical data values and a slope of the trend line may be calculated. In the exemplary calculation shown in step 906, the calculation may obtain a slope of 0.43, which indicates that the slope is increasing.

FIG. 10A shows a first portion of a graphical user interface ("GUI") in accordance with certain embodiments. FIG. 10A includes a direction of compliance summary interface 1002. The summary heading may include a name of the entity, sub-entity or a line of business with which the summary is associated.

Region 1004 may preferably include a "compliance measures" heading. Regions 1014-1020 may preferably include various drivers that may affect compliance. The various drivers may be regulatory changes, complaints, examinations and enforcement actions as well as other suitable drivers. Column 1008 shows a current level of risk associated with each of the drivers. Column 1010 shows a trend forecast associated with each of the drivers. Column 1012 shows the strength of the relationship between each of the drivers and the general compliance determination.

Region 1022 shows control effectiveness measures associated with controlling compliance. Column 1024 shows the element associated with controlling compliance and/or risk of non-compliance. Elements 1026-1034 include issues associated with implementing control effectiveness measures, drivers associated with implementing control effectiveness measures, operational loss associated with implementing control effectiveness measures, monitoring and testing ("M & T") results and monitoring and testing activities.

Column 1036 shows the current level of risk associated with each of the elements. Column 1038 shows the trend/forecast associated with each of the elements. Column 1040 shows the strength of the relationship between each of the elements and the general compliance.

Figure 10B:
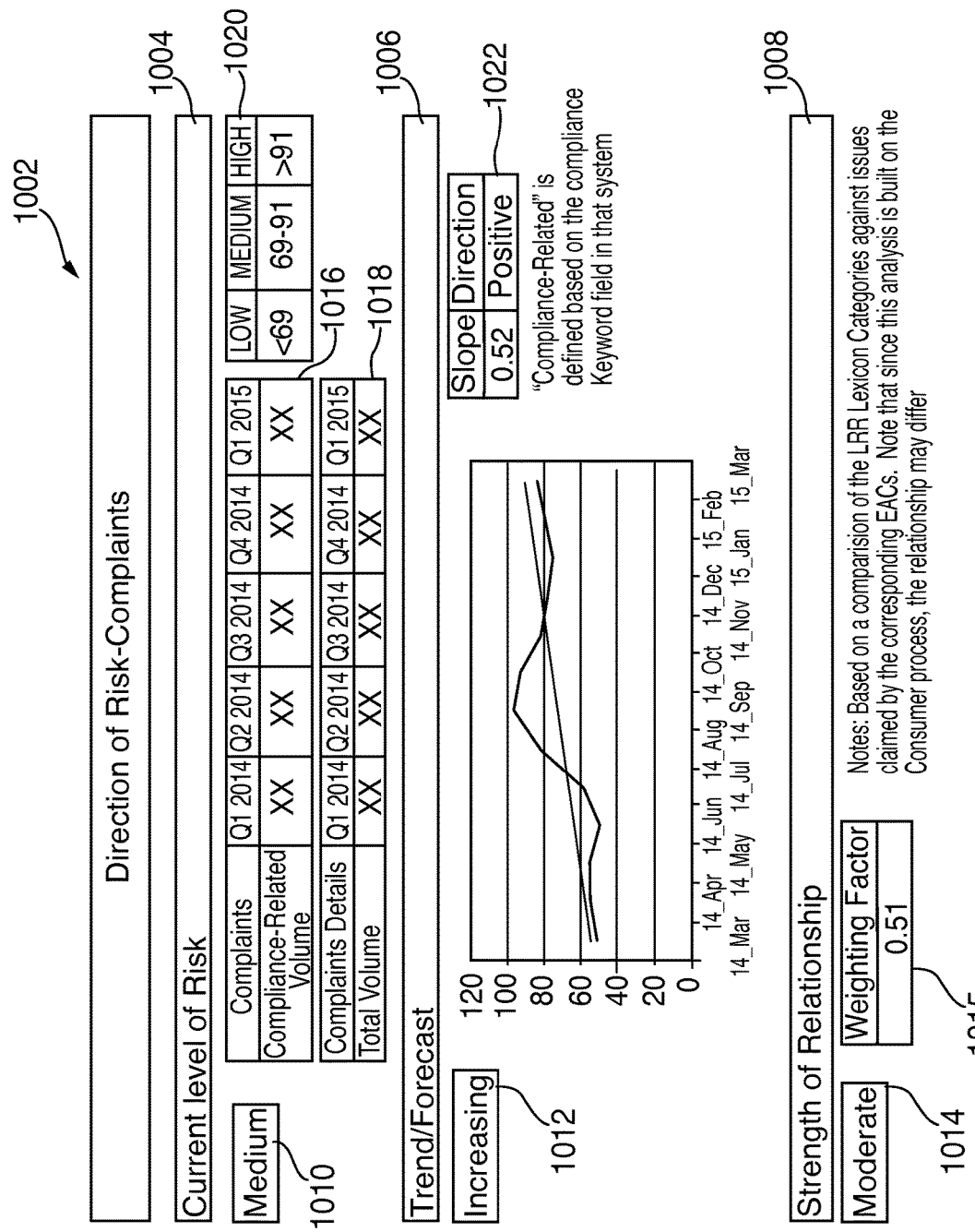
FIG. 10B shows a second portion of a graphical user interface ("GUI") in accordance with certain embodiments.

FIG. 10B shows a second portion of a graphical user interface ("GUI") in accordance with certain embodiments. Region 1102 shows a direction of compliance for a driver such as complaints. A current level of compliance header is found in region 1104. A level of compliance rating is shown as medium in region 1110. A listing of compliance-related complaint volume is shown, quarter to quarter, in region 1116. Region 1118 shows a listing of compliance-related complaint details volume, quarter to quarter. A guide for assigning a value to compliance-related volume is shown in region 1120.

Region 1106 shows trend/forecast area. Region 1112 shows a level of compliance indicator which indicates that the trend of complaints is rated to be increasing. Region 1122 defines a slope of 0.52 which is determined to be positive which corresponds to the increasing indication in region 1112.

Region 1108 shows a strength of relationship area. Region 1114 indicates that the strength of the relationship between complaints and the general level of compliance is moderate with a weighting driver of 0.51, as shown in region 1115.

FIG. 11 shows yet another illustrative flow diagram regarding data extraction, storage, reporting and solution application. In the embodiment shown in FIG. 11, data extractions (referred to, hereinafter, in the alternative as "data pulls") extract data representing a pre-determined time period, such as the past 15 months. This can be implemented using a plurality of Sequel ("SQL") servers or other appropriate hardware. In addition, IBM COGNOS, business intelligence software manufactured by IBM Corporation of Armonk, N.Y., may be used with for implementing the appropriate data extractions and/or for providing a Graphical User Interface.

Step 1132 shows an open issues data pull. Such an open issues data extraction may include the issue type, the issue identification, the date created and the issue reporting group.

Step 1134 shows a drivers data pull. Such a drivers data pull may include driver type—e.g., complaints, etc.—a driver instance, a driver rating and/or a date created.

Step 1136 shows a regulations ("REGS") data pull, which may pull rating name, category name, compliance date and REG change status. Step 1138 may include an Operations Loss Data Pull which may include date of loss, loss amount, type of loss and/or total loss amount.

Step 1140 may include a description of a data pull associated with pending activities—e.g., monitoring and testing. Such a data pull may retrieve or extract data associated with total activities, executed activities, past due activities, a vendor versus internal activities ratio, and/or a manual versus automated activities ratio.

Step 1141 may include a description of regulatory examination issues that may arise. A data pull regarding regulatory examination issues may retrieve or extract a number of exams completed, number of issues arising from such examinations and the number of clean exams—i.e., exams where no issues were reported.

Following data pulls, as set forth in steps 1132-1140, SAS software, manufactured by SAS of Cary, N.C., or other suitable software, may be used to perform data transformations (it should be noted that, in some embodiments, only SAS software and/or hardware may be used to perform the data extractions). Such data transformations may include standard data transformations, as shown in step 1142. Such standard data transformations may include applying enterprise compliance hierarchies ("ECH") and/or transforming the date information into quarters.

Additional data transformations may also be performed, as shown in step 1144. With respect to issues, additional data transformations may include calculating current issues, new issues and overdue issues, based on the extracted data.

Group issues may also be segregated by type, such as by regulator, audit, compliance and control enhancements. With respect to the regulations, the current due, past due and completed regulations may also be calculated. With respect to operations losses, Basel levels may be applied and loss may be calculated by category. With respect to the drivers, Red/Green/Yellow ratings for each relevant driver may be calculated as well as a total rating (preferably in order to determine weighting of each driver) may be calculated. With respect to activities, step 1144 shows calculating a ratio of past due to executed activities, a ratio of manual versus automated activities and a ratio of vendor activities versus internal activities. With respect to exams, step 1144 shows calculating a ratio of issues per exam and a percentage of clean exams.

Step 1146 shows that final data transformations may also be calculated. Such final data transformations may include manual data pulls and transformations, as shown in step 1148. Final transformations may include calculating standard deviations for a pre-determined number of quarters such as for the last four (4) quarters. Such final transformations may include applying threshold values based on previous quarters standard deviations compared to the current quarter's standard deviation. In addition, final transformations may include calculating trends based on a rolling average such as a three-month rolling average.

Manual data pull and transformations, as shown in step 1148, may include complaints data and/or monitoring and testing results data.

The output from the final calculations is shown in step 1150. Such output may include loading data into templates and reporting such data in formats such as IBM COGNOS, MS Excel and MS PowerPoint. MS Excel and MS PowerPoint are software products manufactured by Microsoft Corporation of Redmond, Wash.

It should be noted that additional output may also be obtained using systems and methods according to the invention. For example, based on the output, the systems and methods according to certain embodiments may, for example, dictate a final direction of compliance rating. Such a rating may instruct direction of resources towards ensuring future compliance.

For example, if a driver such as complaints was determined to be increasing, the output may instruct—i.e., send an electronic communication to a relevant party—that additional resources be allocated to increase customer service.

In another example, if a driver, such as regulatory changes, was determined to be increasing, the output may instruct—i.e., send an electronic communication to a relevant party. The message include instructions to allocate additional resources to increase legal research regarding the increasing regulatory changes.

In yet another example, if a driver such as operations data loss was determined to have a greater than expected total loss amount, the output may instruct—i.e., send an electronic communication to a relevant party. The message may include instruction to allocate additional resources to investigate the aggregation of the operations data losses.

Thus, methods and apparatus for enabling performance and analysis of compliance drivers is provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer readable media storing computer executable instructions which, when executed by a processor on a computer system, perform a method for utilizing compliance drivers to conserve system resources and reduce compliance violations, the method comprising: for a pre-determined historical period:

extracting from one or more databases issue information for a plurality of issues, said issue information comprising a plurality of issue records, each of said records comprising an Issue type, an issue identification ("ID"), a record date created, and issue reporting group; extracting from one or more databases regulations data, said regulations data comprising a plurality of regulations records, each of the regulations records comprising a rating name, a category name, a compliance date and a regulation change status:

extracting from one or more databases operations loss data, said operations loss data comprising a plurality of operations loss records, each operations loss record comprising a date of loss, a loss amount, a type of loss and a total loss amount; extracting from one or more databases drivers data, said drivers data comprising a plurality of drivers records, each of said drivers records comprising a driver type, a driver instance, a driver rating and a date created;

extracting from one or more databases a plurality of pending activities and a plurality of pending examinations;

performing, using a processor, a plurality of transformations on the issue records, the drivers data records, the regulations data records, and the operations loss records, said transformations comprising applying enterprise hierarchy information and transforming the date information associated with the issue information, the drivers data, the regulations data, and the operations loss data into quarterly date information;

first, performing, using a processor, an additional plurality of transformations on the issue records, said additional plurality of transformations on the issue records comprising calculating current issue records, new issue records, past due issue records and grouping the plurality of issue records by one of a plurality of types;

second, performing, using a processor, an additional plurality of transformations on the regulations records, said additional plurality of transformations on the regulations records comprising calculating current regulations records, past due regulations records and completed regulations records;

performing, using a processor, an additional plurality of transformations on the operations loss records, the additional plurality of transformations performed on the operations loss records comprising applying Basel levels to each of the records and calculating total loss by category;

third, performing, using a processor, an additional plurality of transformations on the drivers information, said additional plurality of transformations performed on the drivers information comprising calculating current due, past due and completed driver records;

performing, using a processor, final transformations to obtain at least one of sending an electronic notification allocating additional resources to remediate a compliance trend, sending an electronic notification allocating additional resources to remediate a compliance projection, and sending an electronic notification allocating additional resources to correct a current compliance issue; and wherein the performing final calculations farther comprises calculating standard deviations for the issue records, the drivers data records, the regulations data records, and the operations loss records for a predetermined historical number of quarters.

2. The method of claim 1 the performing final calculations further comprising applying threshold values to the issue records, the drivers data records, the regulations data records, and the operations loss records based on a comparison of the predetermined historical number of quarters' standard deviation to the current quarter.

3. The method of claim 2, the performing final calculations further comprising calculating trends for each of the issue records, the drivers data records, the regulations data records, and the operations loss records based on a three-month rolling average.

4. The method of claim 1 the performing final calculations further comprising calculating trends for each of the issue records, the drivers data records, the regulations data records, and the operations loss records based on a rolling average of a predetermined amount of time.

5. The method of claim 1, wherein the group issues by type comprise regulator type, audit type, compliance type and control enhancement types.

6. The method of claim 1, further comprising weighting each of the driver records based, at least in part, on a correlation of each of the driver records to a general compliance value.

7. The method of claim 1, further comprising receiving monitoring data for use in performing said final transformations.

8. The method of claim 1, further comprising receiving testing data for use in performing said final transformations.

9. The method of claim 1, further comprising receiving manually extracted complaints data for use in performing said final transformations.

10. One or more non-transitory computer readable media storing computer executable instructions which, when executed by a processor on a computer system, perform a method for utilizing compliance drivers to conserve system resources and reduce compliance violations, the method comprising:

for a pre-determined historical period:
  extracting from one or more databases issue information for a plurality of issues, said issue information comprising a plurality of issue records, each of said records comprising an issue type, an issue identification ("ID"), a record date created, and issue reporting group;
  extracting from a database regulations data, said regulations data comprising a plurality of regulations records, each of the regulations records comprising a rating name, a category name, a compliance date and a regulation change status;
  extracting from one or more databases operations loss data, said operations loss data comprising a plurality of operations loss records, each operations loss record comprising a date of loss, a loss amount, a type of loss and a total loss amount;
  extracting from one or more databases drivers data, said drivers data comprising a plurality of drivers records, each of said drivers records comprising a driver type, a driver instance, a driver rating and a date created;
  extracting from one or more databases a plurality of pending activities and a plurality of pending examinations;

first, performing, using a processor, a plurality of transformations on the issue records, the drivers data records, the regulations data records, and the operations loss records, said transformations comprising applying enterprise hierarchy information and transforming the date information associated with the issue information, the drivers data, the regulations data, and the operations loss data into quarterly date information;

second, performing, using a processor, an additional plurality of transformations on the issue records, said additional plurality of transformations on the issue records comprising calculating current issue records, new issue records, past due issue records and grouping the plurality of issue records by one of a plurality of types;

performing, using a processor, an additional plurality of transformations on the regulations records, said additional plurality of transformations on the regulations records comprising calculating current regulations records, past due regulations records and completed regulations records;

performing, using a processor, an additional plurality of transformations on the operations loss records, the additional plurality of transformations performed on the operations loss records comprising applying Basel levels to each of the records and calculating total loss by category;

third, performing, using a processor, an additional plurality of transformations on the drivers information, said additional plurality of transformations performed on the drivers information comprising calculating current due, past due and completed driver records;

thereafter, receiving complaints data from manual data extractions;

performing, using a processor, final transformations, said final transformations based, at least in part on the received complaints data, said performing for obtaining at least one of sending an electronic notification allocating additional resources to remediate a compliance trend, sending an electronic notification allocating additional resources to remediate a compliance projection, and sending an electronic notification allocating additional resources to correct a current compliance issue; and wherein the performing final calculations further comprises calculating standard deviations for the issue records, the drivers data records, the regulations data records, and the operations loss records for a predetermined historical number of quarters.

11. The method of claim 10, the performing final calculations further comprising applying threshold values to the issue records, the drivers data records, the regulations data records, and the operations loss records based on a comparison of the predetermined historical number of quarters' standard deviation to the current quarter.

12. The method of claim 11, the performing final calculations further comprising calculating trends for each of the issue records, the drivers data records, the regulations data records, and the operations loss records based on a three-month rolling average.

13. The method of claim 11, the performing final calculations further comprising calculating trends for each of the issue records, the drivers data records, the regulations data records, and the operations loss records based on a rolling average of a predetermined amount of time.

14. The method of claim 10, wherein the group issues by type comprise regulator type, audit type, compliance type and control enhancement types.

15. The method of claim 10, further comprising weighting each of the driver records based, at least in part, on a correlation of each of the driver records to a general compliance value.

16. The method of claim 10, further comprising receiving monitoring data for use in performing said final transformations.

17. The method of claim 10 further comprising receiving testing data for use in performing said final transformations.

\* \* \* \* \*